United States Patent Office 3,036,050
Patented May 22, 1962

3,036,050
VULCANIZING RUBBER WITH HEXAMETHYL-
ENIMINETHIOTHIAZOLES
John J. D'Amico, Charleston, W. Va., assignor to Monsanto Chemical Company, St. Louis, Mo., a corporation of Delaware
No Drawing. Filed Jan. 6, 1960, Ser. No. 694
6 Claims. (Cl. 260—79.5)

This invention relates to a process of vulcanizing rubber and to vulcanized rubber products obtained thereby.

Many good rubber vulcanizing accelerators unfortunately are so active as to develop to varying extents some vulcanization of the rubber compound during preliminary mixing and handling steps where the rubber stock is subjected to temperatures somewhat below normal vulcanizing temperature. Such characteristic commonly known as scorching, results in a finished product of inferior quality or, if scorching is severe, may ruin the rubber altogether.

To reduce scorching, delayed action thiazolesulfenamide accelerators were developed and are widely used. However, improvements in accelerators have scarcely kept pace with heavier demands imposed by higher mixing temperatures. Processing safety has been increased still further by using a delayed action sulfenamide accelerator in conjunction with a nitroso aromatic amine retarder, which practice has become common in the art. However, the rate of vulcanization at curing temperature, in general, decreases as the margin of safety at mixing temperature increases. This is undesirable because higher mixing temperatures which placed added burdens on the accelerator in the first place, resulted from shortening manufacturing cycles to increase production rates and lower unit costs. Consequently, accelerators speedy of action in the cure but essentially inert during the mixing and compounding are much desired. The combination is rare because the characteristics seem to a degree to be mutually exclusive.

In accordance with the present invention it has been found that rubber containing a hexamethyleniminethiothiazole and an aromatic nitrosoamine retarder is remarkably resistant to scorching at temperatures only slightly below those commonly used for curing and yet vulcanizes more rapidly than compositions containing presently used sulfenamide accelerators and aromatic nitrosoamine retarders. These accelerators are of the delayed action type and may be used without nitrosoamine retarders but their advantages are more striking in the presence of retarders. Sulfenamides do not respond uniformly to nitrosoamine retarders. However, these retarders strongly retard the new accelerators below, but not above, curing temperature. The thiazolyl radical is preferably benzothiazolyl because of the ready availability of mercaptobenzothiazole. Substitution in the benzene ring by nitro, chloro, lower alkyl, lower alkoxy or phenyl groups retains accelerating action although the properties are modified. Other thiazolyl radicals comprise naphthothiazolyl, 6,7 - dihydro-4,5-benzobenzothiazolyl, 4-methylthiazolyl, 4,5-dimethylthiazolyl and 4-ethylthiazolyl. The derivatives of non arylene thiazoles, as for example 2-hexamethyleniminethio-4-methylthiazole are oils.

While the preparation of hexamethyleniminethiothiazoles has been suggested, they do not appear to have been actually prepared nor their accelerating properties recognized. They may be prepared by the oxidative condensation of a mercaptobenzothiazole and hexamethylenimine. As an illustration of a satisfactory procedure, a solution was prepared by mixing 43 grams (0.25 mole) of 97% 2-mercaptobenzothiazole, 40 grams (0.25 mole) of 25% sodium hydroxide and 25 grams of water. After stirring the solution for 15 minutes, 99.2 grams (1.0 mole) of hexamethylenimine was added dropwise over a period of 15 minutes and stirring continued for another 15 minutes. Thereupon 42 ml. of 25% sulfuric acid was added dropwise followed by another 15 minute stirring period. There was then slowly added over a period of 90 minutes at 45–50° C. 0.3 mole of sodium hypochlorite in the form of an aqueous solution containing 14.85 grams NaOCl per 100 ml. After heating at 45–50° C. for an additional hour, 4 grams of sodium sulfite and 300 ml. of water were added and the stirred reaction mixture cooled to 10° C. The precipitate was filtered off, washed with water until the washings were neutral to litmus and air-dried at 25–30° C. 2-(1-hexamethylenimine)thiobenzothiazole was obtained in 97% yield as a white solid melting at 101–102° C. after recrystallization from heptane. Analysis gave 10.7% nitrogen and 24.5% sulfur as compared to 10.6% nitrogen and 24.3% sulfur calculated for $C_{13}H_{16}N_2S_2$.

Employing substantially the same reaction conditions and replacing the 2-mercaptobenzothiazole with an equimolar amount, respectively, of 5-chloromercaptobenzothiazole and 6-ethoxymercaptobenzothiazole, further examples of the products of this invention were prepared possessing the following physical properties:

5-chloro-2-(1-hexamethylenimine)thiobenzothiazole, a cream solid, M.P. 72–73° C. after recrystallization from heptane, in 97.5% yield. Analysis gave 9.3% nitrogen, 21.4% sulfur and 12.0% chlorine as compared to 9.4% nitrogen, 21.5% sulfur and 11.9% chlorine calculated for $C_{13}H_{15}ClN_2S_2$.

6-ethoxy-2-(1-hexamethylenimine)thiobenzothiazole, a tan solid, M.P. 79–80° C. after recrystallization from heptane, in 81.2% yield. Analysis gave 9.0% nitrogen and 20.8% sulfur as compared to 9.1% nitrogen and 20.8% sulfur calculated for $C_{15}H_{20}N_2OS_2$.

As illustrative of accelerating properties, employing the known piperidinothiobenzothiazole as a control, valcanizable stocks were compounded comprising

| Stock | A | B | C | D |
|---|---|---|---|---|
| | Parts by weight | | | |
| Smoked sheets rubber | 100 | 100 | 100 | 100 |
| Carbon black | 50 | 50 | 50 | 50 |
| Zinc oxide | 5 | 5 | 5 | 5 |
| Stearic acid | 3 | 3 | 3 | 3 |
| Saturated hydrocarbon softener | 3 | 3 | 3 | 3 |
| Antioxidant | 1 | 1 | 1 | 1 |
| Sulfur | 2.5 | 2.5 | 2.5 | 2.5 |
| N-Nitrosodiphenylamine | 1 | 1 | 1 | 1 |
| 2-Piperidinothiobenzothiazole | 0.5 | | | |
| 2-(1-Hexamethylenimine)thiobenzothiazole | | 0.5 | | |
| 5-Chloro-2-(1-hexamethylenimine)-benzothiazole | | | 0.51 | |
| 6-Ethoxy-2-(1-hexamethylenimine)-benzothiazole | | | | 0.53 |

The stocks so compounded were cured in the usual manner by heating in a press for different periods of time at 144° C. The strength of the vulcanizates at optimum (45 minute) cure and 300% elongation is set forth below:

Table I

| | Stock A | Stock B | Stock C | Stock D |
|---|---|---|---|---|
| Modulus of Elasticity in lbs./in.² at 300% Elongation | 2,420 | 2,525 | 2,250 | 1,850 |

The processing safety of the uncured compositions was evaluated by means of a Mooney plastometer. The time required for incipient vulcanization or scorch was taken as the time required for the Mooney plasticity to rise 10 points above the minimum.

Table II

| Stock: | Mooney scorch in minutes at 135° C. |
|---|---|
| A | 20.0 |
| B | 22.0 |
| C | 25.0 |
| D | 21.4 |

These data demonstrate that the new accelerators impart greater processing safety than piperidinothiobenzothiazole. The time for the Mooney scorch to rise from 10 points above the minimum to 35 points above the minimum furnishes a measure of the cure rate. In the case of Stock B the time was 4.1 minutes whereas it was 6.0 minutes for a similar stock in which the accelerator was 0.5 part of a commercial accelerator which imparted Mooney scorch time comparable to Stock B. Moreover, stronger acceleration was observed in the case of Stock B. In fact 0.4 part of the accelerator of Stock B imparted higher modulus than 0.5 part of the commercial accelerator.

As illustrative of accelerating activity and processing safety in synthetic rubber-like materials, rubbery butadiene-1,3-styrene copolymer vulcanizable stocks were compounded comprising

| Stock | E | F | G | H |
|---|---|---|---|---|
| | Parts by weight | | | |
| GR-S 100 | 100 | 100 | 100 | 100 |
| Carbon black | 50 | 50 | 50 | 50 |
| Saturated hydrocarbon softener | 10 | 10 | 10 | 10 |
| Zinc oxide | 4 | 4 | 4 | 4 |
| Stearic acid | 2 | 2 | 2 | 2 |
| Sulfur | 1.75 | 1.75 | 1.75 | 1.75 |
| 2-Piperidinothiobenzothiazole | 1.2 | | | |
| 2-(1-Hexamethylenimine)thiobenzothiazole | | 1.2 | | |
| 5-Chloro-2-(1-hexamethylenimine)-thiobenzothiazole | | | 1.35 | |
| 6-Ethoxy-2-(1-hexamethylenimine)-thiobenzothiazole | | | | 1.4 |

Vulcanization was completed in 60 minutes at a temperature of 144° C. and the following results obtained on the stocks:

Table III

| Stock | Modulus of Elasticity at 300% Elongation | Tensile at Break in lbs./in.² | Mooney Scorch at 135° C. |
|---|---|---|---|
| E | 2,650 | 3,280 | 25.3 |
| F | 2,280 | 3,200 | 31.7 |
| G | 2,090 | 3,510 | 29.6 |
| H | 1,840 | 3,610 | 25.1 |

The data again demonstrate that Mooney scorch time comparable to that obtained with 2-(1-hexamethylenimine)thiobenzothiazole cannot be obtained with 2-piperidinothiobenzothiazole. While processing safety was as great when the accelerator in Stock F was replaced with an equal weight of a commercial accelerator, the time required for Mooney plasticity to rise from 10 to 35 points above the minimum was 4.4 minutes whereas the corresponding time for Stock F was 1.9 minutes.

By the term "rubber" as employed in the specification and claims, unless otherwise specified, is meant natural rubber and synthetic rubbers which are capable of vulcanization when heated with sulfur and includes latices and reclaims of such materials whether or not admixed with pigments, fillers, softeners, antioxidants, etc. In general, the process of the invention can be carried out with any of the sulfur vulcanizable diene rubbers. This class of rubbers contain a diene hydrocarbon in the polymer structure which contributes unsaturation and sulfur vulcanizability. They include synthetic polyisoprene, polymers of butadiene-1,3 and copolymers of butadiene-1,3 with vinyl monomers copolymerizable therewith, such as styrene and acrylonitrile. Delayed action accelerators are important for use in vulcanizing rubbers in which a diene hydrocarbon constitutes a major proportion of the polymer but accelerate vulcanization of isobutylene polymerized in the presence of a small amount of a diene hydrocarbon (butyl rubber).

Elemental sulfur is ordinarily used as the vulcanizing agent but sulfur vulcanizing agents include organic compounds which contain sulfur that becomes available for cure upon incorporating the compound into rubber and heating the mixture. Various N,N'-thioamines are known to be vulcanizing agents, as for example N,N'-dithiobis morpholine, and may be used in the practice of the invention. In general, any sulfur vulcanizing agent is suitable whether in the form of elemental sulfur or selenium or in the form of a sulfur compound which releases sulfur at vulcanizing temperature. The sulfur level can be varied to achieve particular objectives. The delayed action accelerators may be used alone or in combination with other accelerators, as for example diphenyl guanidine, di-o-tolyl guanidine and diphenyl guanidine phthalate. For most purposes the accelerators of the invention will be used in amounts within the range of 0.1-5.0% of the rubber.

Aromatic nitrosoamine retarders are well known to rubber compounders. Other examples are N-nitroso-N-phenyl-beta-naphthylamine, N-nitroso-1,2-dihydro-2,2,4-trimethylquinoline, N-nitroso-6-ethoxy-1,2-dihydro-2,2,4-trimethylquinoline and nitrosated N-cyclohexyl-N'-phenyl-p-phenylenediamine.

It is intended to cover all changes and modifications of the examples of the invention herein chosen for purposes of disclosure which do not constitute departures from the spirit and scope of the invention.

What is claimed is:

1. A process of vulcanizing sulfur vulcanizable diene rubber composed of a major proportion of diene hydrocarbon which comprises heating at vulcanizing temperature said rubber having incorporated therein sulfur and an accelerating amount of a benzothiazole of the general formula

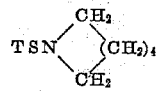

where T is selected from the class consisting of benzothiazolyl, nitro-, chloro-, phenyl-, lower alkyl- and lower alkoxy-substituted benzothiazolyl, lower alkyl thiazolyl, naphthothiazolyl and 6,7-dihydro-4,5-benzobenzothiazolyl.

2. A process of vulcanizing sulfur vulcanizable diene rubber composed of a major proportion of diene hydrocarbon which comprises heating at vulcanizing temperature said rubber having incorporated therein sulfur, aromatic nitrosoamine retarder in amount sufficient to enhance processing safety and an accelerating amount of a benzothiazole of the general formula

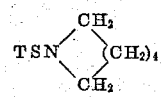

where T is selected from the class consisting or benzothiazolyl, nitro-, chloro-, phenyl-, lower alkyl- and lower alkoxy-substituted benzothiazolyl, lower alkyl thiazolyl, naphthothiazolyl and 6,7-dihydro-4,5-benzobenzothiazolyl.

3. A process of vulcanizing sulfur vulcanizable diene rubber composed of a major proportion of diene hydrocarbon which comprises heating at vulcanizing temperature said rubber having incorporated therein sulfur, and an accelerating amount of 2-(1-hexamethylenimine)thiobenzothiazole.

4. A process of vulcanizing sulfur vulcanizable diene rubber composed of a major proportion of diene hydrocarbon which comprises heating at vulcanizing temperature said rubber having incorporated therein sulfur, aromatic nitrosoamine retarder in amount sufficient to enhance processing safety and an accelerating amount of 2-(1-hexamethylenimine)thiobenzothiazole.

5. A process of vulcanizing sulfur vulcanizable diene rubber composed of a major proportion of diene hydrocarbon which comprises heating at vulcanizing temperature said rubber having incorporated therein sulfur, aromatic nitrosoamine retarder in amount sufficient to enhance processing safety and an accelerating amount of 5-chloro-2-(1-hexamethylenimine)thiobenzothiazole.

6. The vulcanizate obtained by the process of claim 1.

References Cited in the file of this patent

UNITED STATES PATENTS

| | | |
|---|---|---|
| 1,972,918 | Bunbury et al. | Sept. 11, 1934 |
| 2,811,503 | Hand et al. | Oct. 29, 1957 |
| 2,891,924 | Doak | June 23, 1959 |